United States Patent
Aburatani et al.

(10) Patent No.: US 9,991,554 B2
(45) Date of Patent: Jun. 5, 2018

(54) SULFIDE GLASS, AND METHOD FOR PRODUCING SULFIDE GLASS CERAMIC

(71) Applicant: IDEMITSU KOSAN CO., LTD., Chiyoda-ku (JP)

(72) Inventors: Ryo Aburatani, Sodegaura (JP); Tadanori Junke, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 579 days.

(21) Appl. No.: 14/413,893

(22) PCT Filed: Jun. 14, 2013

(86) PCT No.: PCT/JP2013/003745
§ 371 (c)(1),
(2) Date: Jan. 9, 2015

(87) PCT Pub. No.: WO2014/010172
PCT Pub. Date: Jan. 16, 2014

(65) Prior Publication Data
US 2015/0207170 A1    Jul. 23, 2015

(30) Foreign Application Priority Data
Jul. 10, 2012  (JP) ................................. 2012-154383

(51) Int. Cl.
*C03C 10/00*  (2006.01)
*H01M 10/0562*  (2010.01)
(Continued)

(52) U.S. Cl.
CPC ......... *H01M 10/0562* (2013.01); *C03B 19/12* (2013.01); *C03C 3/321* (2013.01);
(Continued)

(58) Field of Classification Search
CPC . C03C 3/321; C03C 4/18; H01B 1/10; H01M 10/052; H01M 10/0562; H01M 6/18
See application file for complete search history.

(56) References Cited

U.S. PATENT DOCUMENTS 8,962,194 B2 *  2/2015  Senga ....................... C03C 4/18
                                                        429/322
9,172,112 B2 * 10/2015  Hama ..................... C03C 3/321
(Continued)

FOREIGN PATENT DOCUMENTS

CN    102089922 A    6/2011
CN    102388420 A    3/2012
(Continued)

OTHER PUBLICATIONS

Office Action dated Sep. 13, 2016 in Japanese Patent Application No. 2014-524619.
(Continued)

*Primary Examiner* — Noah S Wiese
(74) *Attorney, Agent, or Firm* — Oblon, McClelland, Maier & Neustadt, L.L.P.

(57) ABSTRACT

A method for producing sulfide-based glass ceramics including crystallizing a glass solid electrolyte, wherein the glass solid electrolyte includes: sulfide-based glass comprising at least a sulfur element and a lithium element; and a nitrile compound incorporated into the sulfide-based glass.

9 Claims, 1 Drawing Sheet

(51) Int. Cl.
*H01B 1/10* (2006.01)
*C03B 19/12* (2006.01)
*H01M 10/0525* (2010.01)
*C03C 3/32* (2006.01)
*C03C 4/18* (2006.01)
*C03C 14/00* (2006.01)

(52) U.S. Cl.
CPC ............... *C03C 3/323* (2013.01); *C03C 4/18* (2013.01); *C03C 10/00* (2013.01); *C03C 14/008* (2013.01); *H01B 1/10* (2013.01); *H01M 10/0525* (2013.01); *C03B 2201/86* (2013.01); *C03C 2214/17* (2013.01); *H01M 2300/0071* (2013.01)

(56) References Cited

U.S. PATENT DOCUMENTS

| | | | |
|---|---|---|---|
| 2007/0160911 A1 | 7/2007 | Senga et al. | |
| 2010/0140540 A1* | 6/2010 | Yamada | H01M 4/505 252/182.1 |
| 2011/0108642 A1* | 5/2011 | Hama | H01M 10/0562 241/16 |

FOREIGN PATENT DOCUMENTS

| | | | | |
|---|---|---|---|---|
| JP | 5-306119 A | | 11/1993 | |
| JP | 2002-109955 A | | 4/2002 | |
| JP | 2005-228570 A | | 8/2005 | |
| JP | 2008-4459 A | | 1/2008 | |
| JP | 2008-103096 A | | 5/2008 | |
| JP | 2008-120666 A | | 5/2008 | |
| JP | 2012-41207 A | | 3/2012 | |
| JP | 2012-48884 A | | 3/2012 | |
| JP | 2012041207 A | * | 3/2012 | ............... C03C 4/14 |
| TW | 200740000 A | | 10/2007 | |

OTHER PUBLICATIONS

Combined Taiwanese Office Action and Search Report dated Sep. 29, 2016 in Patent Application No. 102121726 (with English translation of categories of cited documents).
International Search Report dated Sep. 17, 2013 in PCT/JP2013/003745.
International Preliminary Report on Patentability and Written Opinion dated Jan. 22, 2015 in PCT/JP2013/003745 (submitting English translation only).
U.S. Appl. No. 14/680,514, filed Apr. 7, 2015, Aburatani, et al.

* cited by examiner

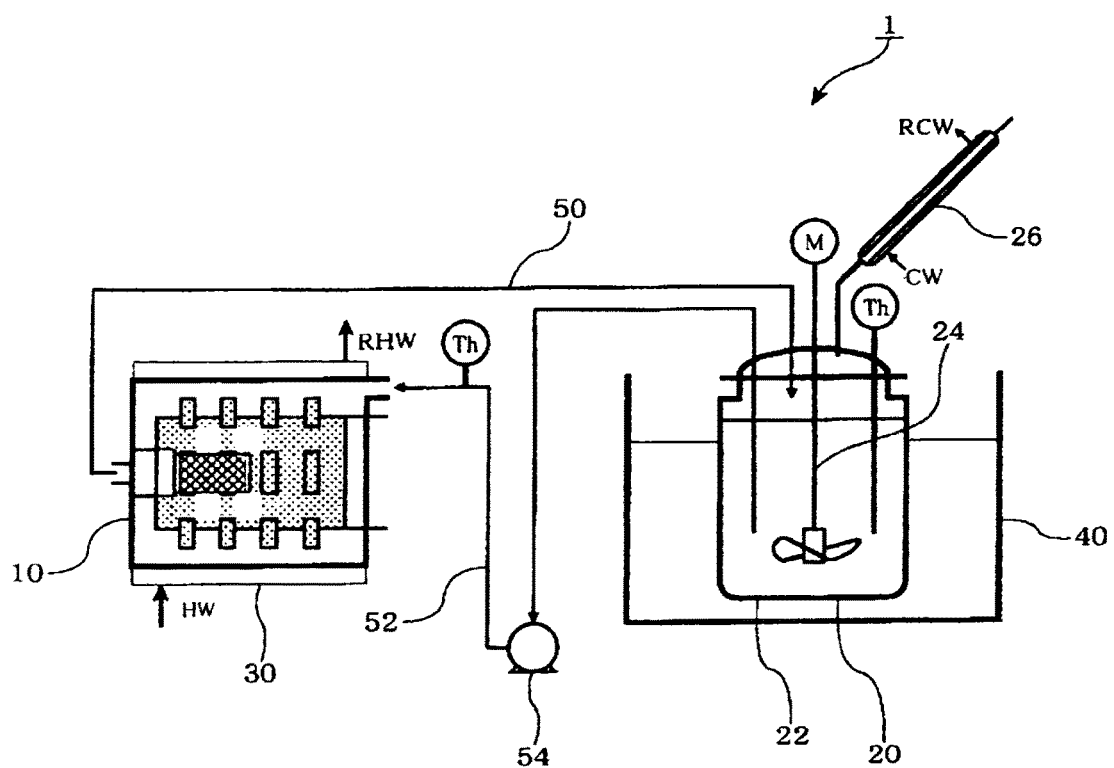

SULFIDE GLASS, AND METHOD FOR PRODUCING SULFIDE GLASS CERAMIC

TECHNICAL FIELD

The invention relates to a sulfide-based glass and a method for producing sulfide-based glass ceramics.

BACKGROUND ART

In a current lithium ion battery, an organic electrolyte solution is mainly used as an electrolyte. Although an organic electrolyte solution exhibits a high ion conductivity, since it is liquid and flammable, when used in a battery, a risk such as leakage or ignition is concerned. Under such circumstances, as an electrolyte for the next-generation lithium ion batteries, development of a safer solid electrolyte has been expected.

For example, Patent Documents 1 and 2 disclose a lithium ion-conducting sulfide-based crystallized glass having a specific crystal structure as a crystallized solid electrolyte.

However, in the technology described in Patent Documents 1 and 2, heating at high temperatures is required to crystallize a sulfide-based glass.

RELATED ART DOCUMENTS

Patent Documents

Patent Document 1: JP-A-2002-109955
Patent Document 2: JP-A-2005-228570

SUMMARY OF THE INVENTION

An object of the invention is to provide a sulfide-based glass and a method for producing sulfide-based glass ceramics which are capable of reducing the temperature during crystallization.

According to the invention, the following method for producing sulfide-based glass ceramics or the like is provided.

1. A sulfide-based glass comprising a nitrile compound, wherein the nitrile compound is incorporated into the sulfide-based glass, and wherein
when the measurement of Raman spectrum is conducted five times and in each of the five measurements, a peak within 330 to 450 cm$^{-1}$ of the Raman spectrum obtained is subjected to waveform separation to obtain peaks corresponding to each component of $PS_4^{3-}$, $P_2S_7^{4-}$ and $P_2S_6^{4-}$, a standard deviation of an area ratio of the peak corresponding to each component is 3.0 area % or less for each of the components and a total of an area ratio of a peak corresponding to $PS_4^{3-}$ and an area ratio of a peak corresponding to $P_2S_7^{4-}$ is 70 area % or more.
2. A method for producing sulfide-based glass ceramics comprising crystallizing a glass solid electrolyte, wherein the glass solid electrolyte comprises: a sulfide-based glass comprising at least a sulfur element and a lithium element; and
a nitrile compound incorporated into the sulfide-based glass.
3. A method for producing sulfide-based glass ceramics comprising:
producing a sulfide-based glass comprising at least a sulfur element and a lithium element in the presence of a nitrile compound to produce a glass solid electrolyte in which the nitrile compound is incorporated into the sulfide-based glass; and
crystallizing the glass solid electrolyte.
4. The method for producing sulfide-based glass ceramics according to 2 or 3, wherein the composition or the glass solid electrolyte are crystallized by heating.
5. The method for producing sulfide-based glass ceramics according to any of 2 to 4, wherein the nitrile compound is a compound represented by the formula (3):

$$R(CN)n \qquad (3)$$

wherein, R is an alkyl group including 1 or more and 10 or less carbon atoms, a cycloalkyl group including 3 or more and 10 or less ring carbon atoms or a group having an aromatic ring including 6 or more and 18 or less ring carbon atoms, and n is 1 or 2.
6. The method for producing sulfide-based glass ceramics according to any of 2 to 5, wherein the sulfide-based glass comprises a phosphorus element.
7. The method for producing sulfide-based glass ceramics according to 2 or 3, wherein a composition comprising a sulfide-based glass and a nitrile compound or the glass solid electrolyte as a raw material of the sulfide-based glass ceramics is crystallized by heating.
8. A method for producing a sulfide-based glass, wherein a raw material comprising at least a compound comprising a sulfur element, a compound comprising a lithium element and a nitrile compound is reacted in an organic solvent.
9. The method for producing a sulfide-based glass according to 8, wherein a temperature of the reaction is 20° C. or more and 80° C. or less.
10. The method for producing a sulfide-based glass according to 8 or 9, wherein a duration of the reaction is 1 hour or longer and 36 hours or shorter.
11. The method for producing a sulfide-based glass according to any of 8 to 10, wherein a total amount of added raw material relative to 1 litr of the organic solvent is 0.001 kg or more and 1 kg or less.
12. The method for producing a sulfide-based glass according to any of 8 to 11, wherein a ratio of the nitrile compound relative to a total of the raw material is 0.1 wt % or more and 2000 wt % or less.
13. The method for producing a sulfide-based glass according to any of 8 to 12, wherein the organic solvent is a mixed solution of the nitrile compound and other organic solvents.
14. The method for producing a sulfide-based glass according to 13, wherein an amount of the nitrile compound in the mixed solution of organic solvents is 0.1 wt % and 20 wt % or less.
15. The method for producing a sulfide-based glass according to any of 8 to 12, wherein the organic solvent is an aprotic organic solvent.
16. The method for producing a sulfide-based glass according to 15, wherein the aprotic organic solvent is one or more selected from the group consisting of a hydrocarbon-based organic solvent, an amide compound, a lactam compound, a urea compound, an organic sulfur compound and a cyclic organic phosphorus compound.
17. The method for producing a sulfide-based glass according to 16, wherein the hydrocarbons organic solvent is one or more selected from the group consisting of a saturated hydrocarbon, an unsaturated hydrocarbon and an aromatic hydrocarbon.
18. The method for producing a sulfide-based glass according to 17, wherein the aromatic hydrocarbon is one or more selected from the group consisting of toluene, xylene, decalin and 1,2,3,4-tetrahydronaphthalene.

19. The method for producing a sulfide-based glass according to 15, wherein the hydrocarbon-based organic solvent is pre-dehydrated.
20. The method for producing a sulfide-based glass according to any of 8 to 19, wherein the raw material further comprises a compound comprising an alkali metal element and/or a halogen element.
21. The method for producing a sulfide-based glass according to 20, wherein the alkali metal element is one or more selected from lithium (Li), sodium (Na), potassium (K), rubidium (Rb), cesium (Cs) and francium (Fr).
22. The method for producing a sulfide-based glass according to 20, wherein the halogen element is one selected from fluorine (F), chlorine (Cl), bromine (Br) and iodine (I).
23. The method for producing a sulfide-based glass according to 20, wherein the compound comprising an alkali metal element and/or a halogen element is one or more selected from the group consisting of LiF, LiCl, LiBr, LiI, BCl$_3$, BBr$_3$, BI$_3$, AlF$_3$, AlBr$_3$, AlI$_3$, AlCl$_3$, SiF$_4$, SiCl$_4$, SiCl$_3$, Si$_2$Cl$_6$, SiBr$_4$, SiBrCl$_3$, SiBr$_2$Cl$_2$, SiI$_4$, PF$_3$, PF$_5$, PCl$_3$, PCl$_5$, POCl$_3$, PBr$_3$, POBr$_3$, PI$_3$, P$_2$Cl$_4$, P$_2$I$_4$, SF$_2$, SF$_4$, SF$_6$, S$_2$F$_{10}$, SCl$_2$, S$_2$Cl$_2$, S$_2$Br$_2$, GeF$_4$, GeCl$_4$, GeBr$_4$, GeI$_4$, GeF$_2$, GeCl$_2$, GeBr$_2$, GeI$_2$, AsF$_3$, AsCl$_3$, AsBr$_3$, AsI$_3$, AsF$_5$, SeF$_4$, SeF$_6$, SeCl$_2$, SeCl$_4$, Se$_2$Br$_2$, SeBr$_4$, SnF$_4$, SnCl$_4$, SnBr$_4$, SnI$_4$, SnF$_2$, SnCl$_2$, SnBr$_2$, SnI$_2$, SbF$_3$, SbCl$_3$, SbBr$_3$, SbI$_3$, SbF$_5$, SbCl$_5$, PbF$_4$, PbCl$_4$, PbF$_2$, PbCl$_2$, PbBr$_2$, PbI$_2$, BiF$_3$, BiCl$_3$, BiBr$_3$, BiI$_3$, TeF$_4$, Te$_2$F$_{10}$, TeF$_6$, TeCl$_2$, TeCl$_4$, TeBr$_2$, TeBr$_4$, TeI$_4$, NaI, NaF, NaCl and NaBr.
24. The method for producing a sulfide-based glass according to any of 20 to 23, wherein a ratio (mol %) of the compound comprising an alkali metal element and/or a halogen element relative to a total of the raw material comprising lithium sulfide, phosphorus pentasulfide and an alkali metal element and/or a halogen element is 1 mol % or more.
25. The method for producing a sulfide-based glass according to any of 20 to 24, wherein a ratio (mol %) of the compound comprising an alkali metal element and/or a halogen element relative to a total of the raw material comprising lithium sulfide, phosphorus pentasulfide and an alkali metal element and/or a halogen element is 50 mol % or less.

According to the invention, the temperature during crystallizing a sulfide-based glass can be lowered.

BRIEF DESCRIPTION OF THE DRAWINGS

FIG. 1 is a view showing an apparatus for producing a sulfide-based glass used in the Examples and the Comparative Examples.

MODE FOR CARRYING OUT THE INVENTION

[Production Method of the Invention]
The production method of the invention is a method for producing sulfide-based glass ceramics comprising crystallizing a glass solid electrolyte, wherein the glass solid electrolyte comprises: a sulfide-based glass comprising at least a sulfur element and a lithium element; and a nitrile compound incorporated into the sulfide-based glass.

According to the production method of the invention, the temperature when a sulfide-based glass is crystallized can be lowered.

1. Sulfide-Based Glass
A composition which is a raw material for sulfide-based glass ceramics comprises a sulfide-based glass. The sulfide-based glass comprises at least a sulfur element and a lithium element.

The sulfide-based glass is preferably a lithium ion-conducting inorganic solid electrolyte which satisfies the composition represented by the following formula (1) or (2).

$$Li_aM_bP_cS_d \quad (1)$$

In the formula (1), M is an element selected from B, Zn, Si, Cu, Ga and Ge.

a to d is a composition ratio of each element. a:b:c:d satisfies 1 to 12:0 to 0.2:1:2 to 9.

b is preferably 0, and it is more preferred that the ratio of a, c and d (a:c:d) be a:c:d=1 to 9:1:3 to 7, and further preferred that the ratio be a:c:d=1.5 to 4:1:3.25 to 4.5.

$$L_aM_bP_cS_dX_e \quad (2)$$

In the formula (2), L is an alkali metal. L is preferably lithium or sodium, with lithium being particularly preferable.

M is an element represented by the following formula (I).

$$B_fAl_gSi_hGe_iAs_jSe_kSn_lSb_mTe_nPb_oBi_p \quad (I)$$

In the formula (I), f to p are independently a composition ratio of each element. f, g, h, i, j, k, l, m, n, o and p are independently 0 or more and 1 or less, and they satisfy f+g+h+i+j+k+l+m+n+o+p=1. The formula (I) represents one element selected from B, Al, Si, Ge, As, Se, Sn, Sb, Te, Pb and Bi, or a combination of two or more elements selected from these elements.

The formula (I) is preferably the case where i, j, k, l, m, n, o and p is 0, i.e. $B_fAl_gSi_h$ (f, g and h are independently 0 or more and 1 or less, and f+g+h=1).

In the formula (2), X is the following formula (II).

$$F_sI_tCl_uBr_v \quad (II)$$

In the formula (II), s, t, u and v are independently a composition ratio of each element. s, t, u and v are independently 0 or more and 1 or less, and satisfy s+t+u+v=1. The formula (II) represents one halogen atom selected from F, Cl, Br and I, or a combination of two or more selected from these halogen atoms.

The formula (II) is preferably the case where s and t are 0, i.e. $Cl_uBr_v$ (u and v are independently 0 or more and 1 or less, and u+v=1). More preferable is the case where s, t and u are independently 0, i.e. Br.

X is preferably one halogen atom selected from F, Cl, Br and I, particularly preferably I, Br or Cl, and more preferably Br.

In the formula (2), a to e are independently a composition ratio of each element. a:b:c:d:e satisfies 1 to 12:0 to 0.2:1:0 to 9:0 to 9.

b is preferably 0, and it is more preferred that the ratio of a, c, d and e (a:c:d:e) be a:c:d:e=1 to 9:1:3 to 7:0.05 to 3, further preferred that a:c:d:e=2 to 6.5:1:3.5 to 5:0.1 to 1.5. Most preferable is a:c:d:e=2 to 6.5:1:3.5 to 4.95:0.1 to 1.5.

Further, a case where b=0 and c=1 is preferable. d=4 is preferable.

The composition ratio of each element, as shown below, can be controlled by adjusting a blending amount of a raw material compound in the production of sulfide-based glass.

As the raw material of a sulfide-based glass, Li$_2$S (lithium sulfide), P$_2$S$_3$ (phosphorus trisulfide), P$_2$S$_5$ (phosphorus pentasulfide), SiS$_2$ (silicon sulfide), Li$_4$SiO$_4$ (lithium orthosilicate), Al$_2$S$_3$ (aluminum sulfide), a single substance phosphorus (P), a single substance sulfur (S), silicon (Si), GeS$_2$ (germanium sulfide), B$_2$S$_3$ (arsenic trisulfide), Li$_3$PO$_4$ (lithium phosphate), Li$_4$GeO$_4$ (lithium germanate), LiBO$_2$ (lithium metaborate), LiAlO$_3$ (lithium aluminate) or the like can be used.

Preferable raw materials of a sulfide-based glass are $Li_2S$ (lithium sulfide) and $P_2S_5$ (phosphorus pentasulfide).

Hereinbelow, an explanation will be made on a sulfide-based glass obtained by using $Li_2S$ (lithium sulfide) and $P_2S_5$ (phosphorus pentasulfide) as the raw materials.

No specific restrictions are imposed on lithium sulfide, and one having high purity is preferable.

Lithium sulfide can be produced by a method stated in JP-A-H07-330312, JP-A-H09-283156, JP-A-2010-163356 and JP-A-2011-84438, for example. For example, in the method for producing lithium sulfide disclosed in JP-A-2010-163356, lithium hydroxide and hydrogen sulfide are allowed to react at 70° C. to 300° C. in a hydrocarbon-based organic solvent to generate lithium hydrosulfide, and the reaction liquid is then hydrodesulfurized, thereby to synthesize lithium sulfide. Further, in the production method disclosed in JP-A-2011-84438, lithium sulfide is synthesized by a method in which lithium hydroxide and hydrogen sulfide are allowed to react at 10° C. to 100° C. in an aqueous solvent to generate lithium hydrosulfide, and the reaction liquid is then hydrodesulfurized, thereby to synthesize lithium sulfide.

As for the lithium sulfide, the total content of a lithium salt of a sulfur oxide is 2.0 wt % or less, more preferably 1.5 wt % or less and the content of lithium N-methylaminobutyrate is preferably 0.15 wt % or less, more preferably 0.1 wt % or less. If the total content of a lithium salt of a sulfur oxide is 2.0 wt % or less, a solid electrolyte obtained becomes a glassy electrolyte (complete amorphous). That is, if the total content of a lithium salt of a sulfur oxide exceeds 2.0 wt %, the resulting electrolyte may be a crystallized product from the beginning. This crystallized product has a low ion conductivity.

Lithium sulfide described in JP-A-H07-330312 and JP-A-H09-283156 contains a lithium salt of a sulfur oxide or the like, it is preferable to conduct purification.

On the other hand, lithium sulfide that is produced by a method described in JP-A-2010-163356 may be used for producing a sulfide-based glass without purification, since the content of a lithium salt of a sulfur oxide or the like is significantly small.

As preferable purification methods, a purification method described in WO2005/40039 or the like can be given. Specifically, lithium sulfide obtained as above is washed in an organic solvent at a temperature of 100° C. or higher.

No specific restrictions are imposed on phosphorus pentasulfide ($P_2S_5$). One having a high purity is preferable. For example, phosphorus pentasulfide having a purity of 90% or more, preferably 95% or more and further preferably 99% or more can be used. The purity of phosphorus pentasulfide can be measured by means of $^{31}$P-NMR.

The ratio (molar ratio) of lithium sulfide and phosphorus pentasulfide is normally 50:50 to 80:20, preferably 60:40 to 75:25.

The ratio is particularly preferably $Li_2S:P_2S_5=68:32$ to 74:26 (molar ratio).

The sulfide-based glass of the invention can be produced from the various raw materials explained above, preferably from $Li_2S$ and $P_2S_5$. In addition to the above-mentioned raw materials, a compound containing an alkali metal element and/or a halogen element may be added.

As the alkali metal element mentioned above, one or more selected from lithium (Li), sodium (Na), potassium (K), rubidium (Rb), cesium (Cs) and francium (Fr) can be given. Among these, one or more selected from lithium and sodium are preferable, with lithium being more preferable.

The halogen element is preferably one or more selected from fluorine (F), chlorine (Cl), bromine (Br) and iodine (I). The halogen element is more preferably Cl, Br or I, with Br or I being particularly preferable.

Specific examples of the compound containing an alkali metal element and/or a halogen element include LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $POCl_3$, $PBr_3$, $POBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl and NaBr, with LiCl, LiBr, LiI, $PCl_5$, $PCl_3$, $PBr_5$ and $PBr_3$ being preferable. LiCl, LiBr, LiI and $PBr_3$ are more preferable.

The ratio (mole %) of the total of lithium sulfide and phosphorus pentasulfide relative to the total of lithium sulfide, phosphorus pentasulfide and the compound containing an alkali metal element and/or a halogen element is preferably 50 mol % or more, may be 55 mol % or more, may be 60 mol % or more, may be 70 mol % or more, may be 80 mol % or more, or may be 85 mol % or more. The ratio is preferably 99 mol % or less, may be 98 mol % or less, may be 97 mol % or less or may be 96 mol % or less.

The ratio (mole %) of the compound containing an alkali metal element and/or a halogen element relative to the total of lithium sulfide, phosphorus pentasulfide and the compound containing an alkali metal element and/or a halogen element is preferably 1 mol % or more, may be 2 mol % or more, may be 3 mol % or more, or may be 4 mol % or more. The ratio is preferably 50 mol % or less, may be 45 mol % or less, may be 40 mol % or less, may be 30 mol % or less, may be 20 mol % or less, or may be 15 mol % or less.

As the method for producing sulfide-based glass, melt quenching, mechanical milling (MM method), the slurry method in which raw materials are reacted in an organic solvent, or the like can be given.

(a) Melt Quenching

The melt quenching method is described in JP-A-H6-279049, WO2005/119706 or the like, for example.

Specifically, a certain amount of $P_2S_5$, $Li_2S$ and a nitrile compound are mixed in a mortar to obtain a pellet. The pellet obtained is vacuum-encapsulated in a carbon-coated quartz tube. After reacting at a specific reaction temperature, the resultant is put in ice for rapid cooling, thereby to obtain a sulfide-based glass solid electrolyte.

The reaction temperature is preferably 400° C. to 1000° C., more preferably 800° C. to 900° C.

The reaction time is preferably 0.1 hour to 12 hours, more preferably 1 to 12 hours.

The temperature at the time of quenching the reaction product mentioned above is normally 10° C. or less, preferably 0° C. or less. The speed of quenching is normally about 1 to 10000 K/sec, with 10 to 10000 K/sec being preferable.

The amount of a nitrile compound used in production is preferably 0.1 wt % or more, more preferably 0.2 wt % or more, with 0.5 wt % or more being further preferable. No specific restrictions are imposed on the upper limit of the amount of the nitrile compound used in production. However, since a larger amount of the nitrile compound used in production leads to an increase in production cost, the amount is preferably 0.1 wt % or more and 100 wt % or less, more preferably 0.2 wt % or more and 80 wt % or less, with 0.5 wt % or more and 50 wt % or less being further preferable.

Meanwhile, the amount of a nitrile compound means the ratio of a nitrile compound relative to the total of raw materials for a sulfide-based glass. The amount of a nitrile compound incorporated into a glass solid electrolyte is "the amount of a nitrile compound in a sulfide-based glass which is detected by gas chromatography analysis" as described later. The excessive amount of a nitrile compound is consumed by volatilization or modification at the time of encapsulation or reaction.

(b) Mechanical Milling

The mechanical milling method (MM method) is described in JP-A-H11-134937, 2004-348972, 2004-348973 or the like, for example.

Specifically, $P_2S_5$, $Li_2S$ and a nitrile compound each are weighed in a specific amount and mixed in a mortar. The mixture is reacted for a certain period of time by using various ball mills or the like to obtain a sulfide-based glass solid electrolyte, for example.

The MM method using the above-mentioned raw materials can be conducted at room temperature. The MM method has an advantage that since a glass solid electrolyte can be produced at room temperature, thermal decomposition of raw materials does not occur, thereby enabling a glass solid electrolyte having the same composition as that of charging to be obtained.

Further, the MM method also has an advantage that a glass solid electrolyte can be finely pulverized at the same time of production of the glass solid electrolyte.

In the MM method, various types of ball mills such as a rotation-, tumbling-, vibration-, planetary ball mill or the like can be used.

As for the condition for the MM method, for example, in the case of using a planetary ball mill, the rotation speed can be several ten to several hundred rotation/minute, and the treatment time can be 0.5 hour to 100 hours.

Further, as described in JP-A-2010-90003, as for the balls in a ball mill, balls differing in diameter may be used in a mixture.

As described in JP-A-2009-110920 or JP-A-2009-211950, an organic solvent may be added to a mixture of lithium sulfide ($Li_2S$), phosphorus pentasulfide ($P_2S_5$) and a nitrile compound to allow the resultant to be in the form of a slurry, and the slurry may be subjected to a mechanical milling treatment.

No restrictions are imposed on the order of mixing at the time of forming a slurry. For example, $P_2S_5$, $Li_2S$, a nitrile compound and an organic solvent may be mixed simultaneously. Alternatively, $P_2S_5$, $Li_2S$ and a nitrile compound may be added to an organic solvent simultaneously or in sequence.

As described in JP-A-2010-30889, the temperature in the mill at the time of mechanical milling may be adjusted.

It is preferable to adjust such that the temperature of the raw materials become 60° C. or higher and 160° C. or lower at the time of mechanical milling.

After recovery of reaction products, in order to remove an excessive amount of a nitrile compound or an organic solvent, it is desirable to conduct a treatment under vacuum at heating conditions.

The amount of a nitrile compound used in the production is preferably 0.1 wt % or more and 500 wt % or less, more preferably 0.1 wt % or more and 400 wt % or less, with 0.5 wt % or more and 300 wt % or less being further preferable.

Here, the amount of a nitrile compound means an amount ratio of a nitrile compound relative to the total raw material of the sulfide-based glass.

After recovery of reaction products, in order to remove an excessive amount of a nitrile compound or an organic solvent, it is desirable to conduct a treatment under vacuum at heating conditions.

(c) Slurry Method

The slurry method is described in WO2004/093099 and WO2009/047977.

Specifically, by reacting a specific amount of $P_2S_5$ particles and a specific amount of $Li_2S$ particles in an organic solvent for a certain period of time, a sulfide-based glass solid electrolyte can be obtained.

As stated in JP-A-2010-140893, in order to allow the reaction to proceed, a reaction may be conducted while circulating a slurry comprising the raw materials between the beads mill and the reaction apparatus.

Further, as described in WO2009/047977, a reaction can be proceeded efficiently when lithium sulfide as the raw material is pulverized in advance.

As described in Japanese Patent Application No. 2010-270191, in order to increase the specific surface area of lithium sulfide as the raw material, lithium sulfide may be immersed in a polar solvent having a dissolution parameter of 9.0 or more (for example, methanol, diethyl carbonate, acetonitrile) for a specific period of time.

The reaction temperature is preferably 20° C. or higher and 80° C. or lower, more preferably 30° C. or higher and 80° C. or lower.

The reaction time is preferably 1 hour or longer and 36 hours or shorter, more preferably 2 hours or longer and 32 hours or shorter.

It is preferred that the amount of an organic solvent be an amount that makes lithium sulfide and phosphorus pentasulfide as the raw material be in the form of a solution or a slurry by addition of an organic solvent. Normally, the amount of the raw material added (total amount) is about 0.001 kg or more and 1 kg or less relative to 1 liter of an organic solvent. The amount of the raw material is preferably 0.005 kg or more and 0.5 kg or less, with 0.01 kg or more to 0.3 kg or less being particularly preferable.

The nitrile compound used in the production is preferably 0.1 wt % or more and 2000 wt % or less, more preferably 0.1 wt % or more and 1500 wt % or less, and further preferably 0.5 wt % or more and 1000 wt % or less. Due to addition of the nitrile compound, effects of stabilizing the operation of a mill during a reaction when electrolyte glass is prepared are obtained.

The nitrile compound as referred to herein means the amount ratio of the nitrile compound relative to the total amount of the raw materials of a sulfide-based glass.

The organic solvent may be a nitrile compound or may be a mixed solution with other organic solvents and a nitrile compound.

The amount of a nitrile compound in an organic solvent is preferably 0.1 wt % or more and 20 wt % or less, more preferably 0.1 wt % or more and 15 wt % or less, with 0.5 wt % or more and 10 wt % or less being further preferable.

A nitrile-containing composition obtained by this technique is a slurry solution that contains an organic solvent and a nitrile compound. This slurry solution may be used as it is in a step where crystallization is conducted. Further, the slurry solution may be dried, and after powder of a nitrile compound-containing composition is removed therefrom, it may be used in the step of crystallization.

No specific restrictions are imposed on the organic solvent. However, an aprotic organic solvent is particularly preferable.

As the aprotic organic solvent, an aprotic organic solvent (for example, a hydrocarbon-based organic solvent), an aprotic polar organic compound (for example, an amide compound, a lactam compound, a urea compound, an organic sulfur compound, a cyclic organic phosphorus compound or the like) may be preferably used as a single solvent or as a mixed solvent.

As for the hydrocarbon-based organic solvent, as the hydrocarbon-based solvent as a solvent, a saturated hydrocarbon, an unsaturated hydrocarbon or an aromatic hydrocarbon can be used.

As the saturated hydrocarbon, hexane, pentane, 2-ethylhexane, heptane, decane, cyclohexane or the like can be given.

As the unsaturated hydrocarbon, hexene, heptene, cyclohexene or the like can be given.

As the aromatic hydrocarbon, toluene, xylene, decalin, 1,2,3,4-tetrahydronaphthalene or the like can be given.

Among these, toluene and xylene are particularly preferable.

It is preferred that the hydrocarbon-based solvent be dehydrated in advance. Specifically, the water content is preferably 100 wt ppm or less, with 30 wt ppm or less being particularly preferable.

According to need, other solvents may be added to the hydrocarbon-based solvent. Specific examples include ketones such as acetone and methyl ethyl ketone; ethers such as tetrahydrofuran; alcohols such as ethanol and butanol; esters such as ethyl acetate; halogenated hydrocarbons such as dichloromethane and chlorobenzene can be given.

The production conditions such as the temperature conditions, the treatment time, the charged amount or the like of the above-mentioned melt quenching method, the MM method and the slurry method can be appropriately adjusted in accordance with equipment used, or the like.

2. Nitrile Compound

The composition as the raw material of the sulfide-based glass ceramics comprises a nitrile compound. The nitrile compound is a compound represented by the following formula (3), for example.

$$R(CN)_n \quad (3)$$

wherein, R is an alkyl group including 1 or more and 10 or less carbon atoms, a cycloalkyl group including 3 or more and 10 or less ring carbon atoms or a group having an aromatic ring including 6 or more and 18 or less ring carbon atoms, preferably R is an alkyl group having a branched structure and including 3 or more and 6 or less carbon atoms, more preferably R is an alkyl group having a branched structure and including 3 or more and 5 or less carbon atoms, and n is 1 or 2.

As examples of the nitrile compound, acetonitrile, propionitrile, 3-chloropropionitrile, benzonitrile, 4-fluorobenzonitrile, tertiary butyronitrile, isobutyronitrile, cyclohexylnitrile, capronitrile, isocapronitrile, malononitrile, fumaronitrile or the like can be given. Among these, propionitrile, isocapronitrile and isobutyronitrile are preferable.

In the composition, the weight ratio of the sulfide-based glass and the nitrile compound is preferably 1:20 to 1:0.01, more preferably 1:15 to 1:0.02, and further preferably 1:10 to 1:0.05. If the amount of the nitrile compound is larger than the amount of the sulfide-based glass, the production efficiency of an intended product is unfavorably lowered.

Further, if the amount of the nitrile compound used is too small, intended effects of lowering the crystallization temperature are not exhibited.

The nitrile compound is incorporated into the inside of the sulfide-based glass. A nitrile compound that is not incorporated may be present other than that is incorporated into the inside of the sulfide-based glass.

The expression that "the nitrile compound is incorporated into the inside of the sulfide-based glass" means as follows. When a sulfide-based glass is separated from the composition, the separated sulfide-based glass is heated at a temperature of 100° C. under vacuum, and then dissolved in a polar solvent such as water and alcohol to obtain a homogenous solution. When the homogenous solution is analyzed by gas chromatography, and the nitrile compound is detected.

The amount of the nitrile compound in the sulfide-based glass detected by the above-mentioned gas chromatography analysis is preferably 0.1 wt % or more and 30 wt % or less, more preferably 0.1 wt % or more and 20 M % or less, and further preferably 0.5 wt % or more and 15 wt % or less, relative to the total weight of the sulfide-based glass and the nitrile compound.

If the amount of the nitrile compound is less than 0.1 wt %, effects of lowering the crystallization temperature may be small, and if the amount of the nitrile compound is larger than 30 wt %, an intended crystal structure may not be formed.

3. Other Contents

The composition as the raw material of the sulfide-based glass ceramics may comprise an arbitrary solvent other than a nitrile compound.

No specific restrictions are imposed on the arbitrary solvent. However, an aprotic organic solvent is particularly preferable.

As the aprotic organic solvent, an aprotic organic solvent (for example, a hydrocarbon-based organic solvent), an aprotic polar organic compound (for example, an amide compound, a lactam compound, a urea compound, an organic sulfur compound, a cyclic organic phosphorus compound or the like) can preferably be used as a single solvent or as a mixed solvent.

As for the hydrocarbon-based organic solvent, as the hydrocarbon-based solvent as the solvent, a saturated hydrocarbon, an unsaturated hydrocarbon or an aromatic hydrocarbon can be used.

As the saturated hydrocarbon, hexane, heptane, 2-ethylhexane, heptane, decane, cyclohexane or the like can be given.

As the unsaturated hydrocarbon, hexene, heptene, cyclohexene or the like can be given.

As the aromatic hydrocarbon, toluene, xylene, decalin, 1,2,3,4-tetrahydronaphthalene or the like can be given.

Among these, toluene and xylene are particularly preferable.

In the composition, the amount ratio of the nitrile compound and the other solvent is preferably 0.1:99.9 to 99.9:0.1 (weight ratio), more preferably 1:99 to 99:1 (weight ratio), and further preferably 3:97 to 98:2 (weight ratio).

Here, other solvents may be or may not necessary be incorporated into the inside of the sulfide-based glass. If the content of the nitrile compound is small, i.e. less than 0.1:99.9 (weight ratio), lowering of the crystallization temperature may be insufficient.

4. Crystallization

As for crystallization, it is preferred that crystallization be conducted by heating the above-mentioned composition.

The temperature at the time of crystallization may be appropriately determined according to an intended crystal structure.

For example, in order to obtain a $Li_7P_3S_{11}$ crystal structure, the crystallization temperature is preferably 80° C. or higher and 250° C. or lower, more preferably 100° C. or higher and 240° C. or lower. In order to obtain a $Li_3PS_4$ crystal structure, the crystallization temperature is preferably 80° C. or higher and 250° C. or lower, more preferably 100° C. or higher and 220° C. or lower.

It is preferred that the crystallization be conducted under vacuum or in an inert gas atmosphere. The heating time may be appropriately changed according to the intended crystal structure or the heating temperature. For example, it may be 10 minutes or longer and 5 hours or shorter.

[Sulfide-Based Glass of the Invention]

In the sulfide-based glass of the invention, a peak specific to this glass is detected in a Raman shift at 330 to 450 $cm^{-1}$, in particular at around 400 $cm^{-1}$ in the Raman spectrum. This peak is asymmetrical, and hence it is a mixed peak of plural components. This peak is identified as a mixed peak of three components, i.e. $PS_4^{3-}$, $P_2S_7^{4-}$ and $P_2S_6^{4-}$ (M. Tachez, J.-P. Malugani, R. Mercier, and G. Robert, Solid State Ionics, 14, 181 (1984)).

It is desirable to detect the above-mentioned peak according to each component by using an apparatus having a high resolving power. Even if peak separation is insufficient, it is possible to separate the peak into individual peaks by using a common waveform analysis software or a waveform analysis software dedicated to the apparatus. As the waveform analysis software, GRAMS AI manufactured by Thermo SCIENTIFIC K.K. can be used. From the separated peaks, the area value of each component can be obtained, and the peak intensity ratio (area %) of each component of the above-mentioned three components ($PS_4^{3-}$, $P_2S_7^{4-}$ and $P_2S_6^{4-}$) can be obtained.

A specific method for waveform separation is as follows.
(1) For each Raman spectrum, a straight line is drawn such that the line passes measurement points at 460 $cm^{-1}$ and 350 $cm^{-1}$. The line is used as a base line.
(2) The above-mentioned base line is subtracted from experimental points between 460 $cm^{-1}$ and 350 $cm^{-1}$.
(3) By using the non-linear least-square method, the peak is separated into peaks represented by three fitting functions corresponding to $PS_4^{3-}$, $P_2S_7^{4-}$ and $P_2S_6^{4-}$ (the sum of the 80% Gaussian function and the 20% Lorentz function), and the area intensity ratio of each peak is calculated (use of waveform separation software).

The peak positions of the fitting function of $P_2S_7^{4-}$ and $P_2S_6^{4-}$ are respectively fixed to 406 $cm^{-1}$ and 385 $cm^{-1}$, and the initial value of the peak position of the fitting function of $PS_4^{4-}$ is set at 420 $cm^{-1}$.

It is preferred that the measurement of Raman spectrum be conducted five time (five locations) for a single object to be measured (agglomerate of particles). The same location of the single object to be measured is not repeatedly measured. Five different locations of the object to be measured are measured. If the measurement of Raman spectrum is conducted plural times for the same object to be measured, the standard deviation of the peak area value (peak intensity ratio) for each component can be calculated from the above-mentioned area value (peak intensity ratio) by a general calculation method.

In the sulfide-based glass of the invention, if a standard deviation of an area ratio (area %) of the peak corresponding to each component ($PS_4^{3-}$, $P_2S_7^{4-}$ or $P_2S_6^{4-}$) is 3.0 area % or less, the surface of each glass particle is homogeneous. As a result, when this sulfide-based glass is used in a battery, the battery performance is stabilized. The above-mentioned standard deviation is preferably 2.7 area % or less for each component, more preferably 2.5 area % or less for each component, and particularly preferably 2.2 area % or less for each component.

Among these components, $PS_4^{3-}$ and $P_2S_7^{4-}$ are components having a high conducting performance. It is preferred that the ratio of these components be high. Specifically, in the three components of $PS_4^{3-}$, $P_2S_7^{4-}$ and $P_2S_6^{4-}$, the total of the area ratios of a peak corresponding to $PS_4^{3-}$ and a peak corresponding to $P_2S_7^{4-}$ ($PS_4^{3-}+P_2S_7^{4-}$) is 70 area % or more. Preferably, $PS_4^{3-}+P_2S_7^{4-}$ is 75 area % or more, more preferably, $PS_4^{3-}+P_2S_7^{4-}$ is 80 area % or more. Further, $P_2S_6^{4-}$ is a component having low conducting performance, and the ratio of this component is 30 area % or less.

EXAMPLES

Production Example 1—Production of Lithium Sulfide (1)

(1) Production of Lithium Sulfide

Lithium sulfide ($Li_2S$) was produced in accordance with the method in the first aspect (two-step method) of JP-A-H07-330312. Specifically, in a 10 L-autoclave provided with a stirring blade, 3326.4 g (33.6 mol) of N-methyl-2-pyrolidone (NMP) and 287.4 g (12 mol) of lithium hydroxide were charged, stirred at a speed of 300 rpm and heated to 130° C. After the heating, hydrogen sulfide was blown to the liquid at a supply speed of 3 l/min for 2 hours.

Subsequently, the reaction liquid was heated in a nitrogen stream (200 cc/min), and part of the reacted hydrogen sulfide was hydrodesulfurized. As the temperature was elevated, water produced as a by-product by a reaction of hydrogen sulfide and lithium hydroxide starts to evaporate. This water was condensed by means of a condenser and withdrawn outside the system. With distillation off of the water outside the system, the temperature of the reaction liquid was increased. When the temperature of the reaction liquid reached 180° C., the heating was stopped and the temperature was retained at a certain temperature. After completion of the hydrodesulfurization reaction (about 80 minutes), the reaction was completed, whereby lithium sulfide was obtained.

(2) Purification of Lithium Sulfide

NMP in 500 mL of the slurry reaction solution obtained in (1) above (NMP-lithium sulfide slurry) was subjected to decantation. 100 mL of dehydrated NMP was added, and stirred at 105° C. for about one hour. At that temperature, NMP was subjected to decantation. Further, 100 mL of NMP was added, and the mixture was stirred at 105° C. for about 1 hour. At that temperature, NMP was subjected to decantation. The similar operation was repeated 4 times in total. After completion of the decantation, lithium sulfide was dried for 3 hours at 230° C. (a temperature that is equal to or higher than the boiling temperature of NMP) under normal pressure under nitrogen stream. The content of impurities in the resulting lithium sulfide was measured.

The content of each of the sulfur oxides of lithium sulfite ($Li_2SO_3$), lithium sulfate ($Li_2SO_4$) and lithium thiosulfate ($Li_2S_2O_3$) and the content of lithium N-methylaminobutyrate (LMAB) were quantified by ion chromatography. As a result, the content of sulfur oxides was found to be 0.13 wt % and the content of LMAB was found to be 0.07 wt %.

Production Example 2—Production of Lithium Sulfide (2)

Production and purification of lithium sulfide were conducted in the same manner as Example 2 of JP-A-2010-163356. Specifically, the production and purification were conducted as follows.

Under nitrogen stream, as a non-aqueous medium, 270 g of toluene (manufactured by Hiroshima Wako Co., Ltd.) was added to a 600 mL-separable flask. Subsequently, 30 g of lithium hydroxide (manufactured by Honjyo Chemical Corporation) was put, and while stirring by means of a Fullzone stirring blade at 300 rpm, the temperature was kept at 95° C.

While blowing hydrogen sulfide (manufactured by Tomoe Shokai Co., Ltd.) into the slurry at a supply speed of 300 mL/min, the slurry was heated to 104° C. From the separable flask, an azeotropic gas of water and toluene was continuously discharged. By condensing by means of a condenser outside the system, this azeotropic gas was dehydrated. During this time, toluene in an amount that is equal to the amount of the toluene that distills off was continuously supplied, and the reaction liquid level was kept constant.

The amount of water in the condensed liquid was gradually decreased. After the lapse of 6 hours from the start of introduction of hydrogen sulfide, distillation of water was no longer observed (the total water amount was 22 mL). During the reaction, a state was kept in which solid matters were dispersed and stirred in toluene, and there was no water separated from toluene.

Thereafter, the hydrogen sulfide was changed to nitrogen, and the nitrogen was circulated at 300 mL/min for 1 hour.

In the analysis of white powder obtained by filtering and drying solid matters (hydrochloric acid titration and silver nitrate titration), the purity of lithium sulfide was 98.5%. In the X-ray diffraction measurement, it was confirmed that no peak other than the crystal pattern of lithium sulfide was detected. For the resulting lithium sulfide, the specific surface area was measured by the BET method with nitrogen gas by means of AUTOSORB 6. As a result, it was found to be 12.6 m$^2$/g.

Example 1 (Li/P Molar Ratio=70/30)

An apparatus shown in FIG. 1 was used. As a stirrer, Star mill miniature (0.15 L) (Beads mill) manufactured by Ashizawa Finetech Ltd. was used, and 450 g of zirconia balls each having a diameter of 0.5 mm were charged therein. As a temperature keeping chamber, a 1.5 L-glass reactor provided with a stirrer was used.

1140 g of dehydrated toluene (manufactured by Hiroshima Wako Co., Ltd.) and 60 g of dehydrated isobutyronitrile were added to 39.05 g (70 mol %) of the lithium sulfide (Li$_2$S) produced in Production Example 2 and 80.95 g (30 mol %) of phosphorus pentasulfide (P$_2$S$_5$) (manufactured by Sigma-Aldrich Co.) to obtain a mixture. The mixture was charged in the temperature keeping chamber and the mill.

By means of a pump, the content was allowed to circulate between the temperature keeping chamber and the mill at a flow rate of 400 mL/min., until the temperature of the temperature-keeping chamber was elevated to 80° C.

The mill main body was driven at a circumferential speed of 8 m/s, while hot water was passed through the mill main body by the external circulation such that the liquid temperature therein could be kept at 70° C. After about 12 hours-reaction, a slurry was taken out, and part thereof was dried at 150° C. to obtain white powdery electrolyte glass.

The resulting white powdery electrolyte glass was heated in vacuum at a temperature of 100° C. Further, dehydrated methanol was added thereto, whereby a homogeneous solution was obtained. After that, for the homogeneous solution obtained, gas chromatography was conducted. As a result, it was found that the solution contained 2.9 wt % of isobutyronitrile.

Moreover, the slurry solution of this white powder was capsulated in an autoclave which had been substituted by nitrogen and heated at 180° C. for 2 hours, whereby electrolyte glass ceramic was obtained. For the electrolyte glass ceramic obtained, the X-ray diffraction (XRD) measurement (CuKα: λ=1.5418 Å) was conducted. As a result, it was found that the XRD spectrum was the crystal pattern derived from Li$_7$P$_3$S$_{11}$.

As the result of an ion conductivity measurement, the ion conductivity of this powder was found to be 1.8×10$^{-3}$ S/cm.

Comparative Example 1 (Li/P Molar Ratio=70/30)

Electrolyte glass was prepared under the same conditions as in Example 1, except that isobutyronitrile was not added. The resulting electrolyte glass was heated at 180° C. for 2 hours. For the heated electrolyte glass, no crystal pattern was observed from XRD spectrum. Therefore, it was confirmed that the resulting electrolyte glass was not crystallized by a heating treatment at 180° C. and remained in the state of electrolyte glass. The ion conductivity was 1.5×10$^{-4}$ S/cm.

Comparative Example 2 (Li/P Molar Ratio=70/30)

Preparation was conducted under the same conditions as in Comparative Example 1, except that the temperature of heating a slurry solution was changed from 180° C. to 250° C. The resulting XRD spectrum was a crystal pattern derived from Li$_7$P$_3$S$_{11}$. The ion conductivity was 1.5×10$^{-3}$ S/cm.

Example 2 (Li/P Molar Ratio=75/25)

Preparation was conducted under the same conditions as in Example 1, except that the charged raw materials were changed to be 42.1 g (75 mol %) of Li$_2$S and 67.9 g (25 mol %) of P$_2$S$_5$ (manufactured by Sigma-Aldrich Co.) and the reaction time was changed to 40 hours. The XRD spectrum of the resulting electrolyte glass ceramic was the pattern derived from Li$_3$PS$_4$. The ion conductivity of the electrolyte glass ceramic was 1.1×10$^4$ S/cm. It seemed that the mill was driven very stably during the reaction due to stable driving power of the mill during the reaction.

The driving of the mill during the reaction tends to be unstable when electrolyte glass having a large amount of Li$_2$S is prepared. However, due to the addition of the nitrile compound, effects that the operation of the mill becomes stable can be obtained.

Further, the electrolyte glass was heated under vacuum at a temperature of 100° C., followed by addition of dehydrated methanol to obtain a homogenous solution. The solution was subjected to gas chromatography, and it was revealed that the solution contained 2.6 wt % of isobutyronitrile.

Example 3 (Li/P Molar Ratio=75/25)

Preparation was conducted under the same conditions as in Example 1, except that the charged raw materials were changed to be 42.1 g (75 mol %) of $Li_2S$ and 67.9 g (25 mol %) of $P_2S_5$ (manufactured by Sigma-Aldrich Co.) and the reaction conditions were changed to as follows: reaction time: 40 hours, the temperature of the temperature-keeping chamber: 40° C., the liquid temperature in the mill: retained at 40° C. The XRD spectrum of the resulting electrolyte glass ceramic was the pattern derived from $Li_3PS_4$. The ion conductivity of the electrolyte glass ceramic was $1.2 \times 10^{-4}$ S/cm. It seemed that the mill was driven very stably during the reaction due to stable driving power of the mill during the reaction.

The driving of the mill during the reaction tends to be unstable when electrolyte glass having a large amount of $Li_2S$ is prepared. However, due to the addition of the nitrile compound, effects that the operation of the mill becomes stable can be obtained.

Further, the electrolyte glass was heated under vacuum at a temperature of 100° C., and dehydrated methanol was added thereto, whereby a homogeneous solution was obtained. After that, for the homogeneous solution obtained, gas chromatography was conducted. As a result, it was found that the solution contained 2.4 wt % of isobutyronitrile.

Comparative Example 3 (Li/P Molar Ratio=75/25)

Electrolyte glass was prepared under the same conditions as in Example 2, except that preparation of electrolyte glass was conducted without addition of isobutyronitrile. No crystal pattern was observed in the XRD spectrum. It was confirmed that the crystallization did not occur by a heating treatment at 180° C., and the state as the electrolyte glass was kept. The ion conductivity was $1.1 \times 10^{-4}$ S/cm.

Example 4 (Li/P Molar Ratio=70/30)

0.6508 g (0.01417 mol) (70 mol %)) of lithium sulfide ($Li_2S$) produced in Production Example 1 and 1.3492 g (0.00607 mol (30 mol %)) of phosphorus pentasulfide ($P_2S_5$) (manufactured by Sigma-Aldrich Co.) were fully mixed. The mixed powder, 1.8 g of toluene, 0.2 g of isobutyronitrile, ten zirconia-made balls each having a diameter of 10 mm and a planetary ball mill (Model: P-7 manufactured by Fritch Japan, Co., Ltd.) were placed in an alumina-made pot, and the pot was completely sealed. The alumina-made pot was filled with nitrogen to allow it to have a nitrogen atmosphere.

For the initial several minutes, the planetary ball mill was operated at a low speed (85 rpm) to mix lithium sulfide and phosphorous pentasulfide sufficiently. Thereafter, the number of revolution of the planetary ball mill was gradually increased to 370 rpm. Mechanical milling was conducted at a number of rotation of the planetary ball mill of 370 rpm for 20 hours. A reaction product was recovered, dried at 150° C. to obtain white powder. The powder was evaluated by X-ray diffraction (XRD) measurement (CuKα: λ=1.5418 Å). As a result, it could be confirmed that the powder was vitrified (sulfide glass).

This sulfide glass was heated under vacuum at a temperature of 100° C. Further, dehydrated methanol was added thereto, whereby a homogeneous solution was obtained. For the homogeneous solution obtained, gas chromatography was conducted. As a result, it was found that the solution contained 2.8 wt % of isobutyronitrile.

The powder of sulfide glass was heated at 180° C. for 2 hours in nitrogen atmosphere, whereby electrolyte glass ceramic was obtained. The XRD spectrum of the resulting electrolyte glass ceramic showed the crystal pattern derived from $Li_7P_3S_{11}$.

As a result of the measurement of an ion conductivity, the ion conductivity of this powder was found to be $1.7 \times 10^{-3}$ S/cm.

Comparative Example 4 (Li/P Molar Ratio: 70/30)

Electrolyte glass was prepared under the same conditions as in Example 4, except that the preparation of electrolyte glass was conducted without addition of isobutyronitrile. No crystal pattern was observed in the XRD spectrum. It was confirmed that the crystallization did not occur by a heating treatment at 180° C., and the state as the electrolyte glass was kept. The ion conductivity was $1.1 \times 10^{-4}$ S/cm.

Example 5 (Li/P Molar Ratio: 75/25)

Electrolyte glass was prepared under the same conditions as in Example 2, except that 6 g of isobutyronitrile was added. It seemed that the mill was driven very stably during the reaction due to stable operation of the mill during the reaction. This electrolyte glass was heated at 200° C. for 2 hours. The XRD spectrum of the resulting electrolyte glass ceramic showed the pattern derived from $Li_3PS_4$. The ion conductivity of the electrolyte glass ceramic was $1.2 \times 10^{-4}$ S/cm.

The driving of the mill during the reaction tends to be unstable when electrolyte glass having a large amount of $Li_2S$ is prepared, however, due to the addition of a small amount of the nitrile compound, effects that the operation of the mill becomes stable can be obtained.

This electrolyte glass was heated under vacuum at a temperature of 100° C. Further, dehydrated methanol was added thereto, whereby a homogeneous solution was obtained. For the homogeneous solution obtained, gas chromatography was conducted. As a result, it was found that the solution contained 1.9 wt % of isobutyronitrile.

Comparative Example 5 (Li/P Molar Ratio: 75/25)

Electrolyte glass was prepared under the same conditions as in Example 2, except that isobutyronitrile was not added. Since the driving power of the mill during the reaction was unstable, the operation of the mill during the reaction is assumed to be unstable. This electrolyte glass was heated at 200° C. for 2 hours. The glass was not crystallized, and remained in the state of electrolyte glass. The ion conductivity was $1.2 \times 10^{-4}$ S/cm.

Example 6 (Li/P/Br Molar Ratio=64/21/15)

Electrolyte glass was prepared under the same conditions as in Example 2, except that the charged raw materials were changed to 36.3 g (64 mol %) of $Li_2S$, 57.6 g (21 mol %) of $P_2S_5$ (manufactured by Sigma-Aldrich Co.) and 16.1 g (15 mol %) of LiBr (manufactured by Sigma-Aldrich Co.), and 6 g of isobutylnitrile was added. It seemed that the mill was driven very stably during the reaction, since the driving power of the mill during the reaction was stable. This electrolyte glass was heated at 200° C. for 2 hours, whereby glass ceramic was obtained. The ion conductivity of the electrolyte glass ceramic was $1.5 \times 10^{-3}$ S/cm.

The driving of the mill during the reaction tends to be unstable when electrolyte glass having a large amount of $Li_2S$ is prepared, however, due to the addition of a small amount of the nitrile compound, effects that the operation of the mill becomes stable can be obtained.

This electrolyte glass was heated under vacuum at a temperature of 100° C. Further, dehydrated methanol was added thereto, whereby a homogeneous solution was obtained. For the homogeneous solution obtained, gas chromatography was conducted. As a result, it was found that the solution contained 2.0 wt % of isobutyronitrile.

Comparative Example 6 (Li/P/Br Molar Ratio=64/21/15)

Electrolyte glass was prepared under the same conditions as in Example 6, except that isobutyronitrile was not added. Since the driving power of the mill during the reaction was unstable, the operation of the mill during the reaction is assumed to be unstable. This electrolyte glass was heated at 200° C. for 2 hours. It was confirmed that the crystallization did not occur and the state as the electrolyte glass was kept. The ion conductivity was $4.0 \times 10^{-4}$ S/cm.

The results of the Examples and the Comparative Examples are shown in Table 1 and Table 2. Table 2 shows the results of waveform separation. Specifically, for the electrolyte glass ceramics obtained in each Example, Raman spectrum was measured five times, and a peak within a range of 330 to 450 cm$^{-1}$ was separated into peaks corresponding to each component ($PS_4^{3-}$, $P_2S_7^{4-}$ and $P_2S_6^{4-}$). The results of this waveform separation are shown in Table 2.

TABLE 2

| | Peak intensity ratio (area %) | | | | Standard deviation (area %) | | |
|---|---|---|---|---|---|---|---|
| | $PS_4^{3-}$ | $P_2S_7^{4-}$ | $P_2S_6^{4-}$ | $PS_4^{3-}+P_2S_7^{4-}$ | $PS_4^{3-}$ | $P_2S_7^{4-}$ | $P_2S_6^{4-}$ |
| Example 1 | 21.4 | 63.8 | 14.8 | 85.2 | 1.0 | 0.9 | 0.3 |
| Example 2 | 79.3 | 14.2 | 6.5 | 93.5 | 2.0 | 1.4 | 0.7 |
| Example 3 | 80.1 | 13.5 | 6.4 | 93.6 | 2.1 | 1.3 | 0.9 |
| Example 4 | 29.2 | 63.3 | 7.5 | 92.5 | 0.3 | 0.3 | 0.1 |
| Example 5 | 81.0 | 12.5 | 6.5 | 93.5 | 2.2 | 1.3 | 0.5 |

INDUSTRIAL APPLICABILITY

By using the method for producing sulfide-based glass ceramics of the invention, it is possible to decrease the temperature when crystallizing sulfide-based glass. The resulting sulfide-based glass ceramics can preferably be used in a solid electrolyte for a lithium secondary battery, or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention.

TABLE 1

| | Exam. 1 | Comp. Ex. 1 | Comp. Ex. 2 | Exam. 2 | Exam. 3 | Comp. Ex. 3 |
|---|---|---|---|---|---|---|
| Li$_2$S:P$_2$S$_5$ or Li$_2$S:P$_2$S$_5$:LiBr (molar ratio) | 70:30 | 70:30 | 70:30 | 75:25 | 75:25 | 75:25 |
| Li$_2$S used as the raw material | Pro. Ex. 2 | Pro. Ex. 2 | Pro. Ex. 2 | Pro. Ex. 2 | Pro. Ex. 2 | Pro. Ex. 2 |
| Added amount of Isobutyronitile [g] | 60 | — | — | 60 | 60 | — |
| Content of isobutyronitrile [wt %] | 2.9 | — | — | 2.6 | 2.4 | — |
| Temperature of Crystallization [° C.] | 180 | 180 | 250 | 180 | 180 | 180 |
| XRD crystal pattern | Li$_7$P$_3$S$_{11}$ | — | Li$_7$P$_3$S$_{11}$ | Li$_3$PS$_4$ | Li$_3$PS$_4$ | — |
| Ionic conductivity [S/cm] | $1.8 \times 10^{-3}$ | $1.5 \times 10^{-4}$ | $1.5 \times 10^{-3}$ | $1.1 \times 10^{-4}$ | $1.2 \times 10^{-4}$ | $1.1 \times 10^{-4}$ |

| | Exam. 4 | Comp. Ex. 4 | Exam. 5 | Comp. Ex. 5 | Exam. 6 | Comp. Ex. 6 |
|---|---|---|---|---|---|---|
| Li$_2$S:P$_2$S$_5$ or Li$_2$S:P$_2$S$_5$:LiBr (molar ratio) | 70:30 | 70:30 | 75:25 | 75:25 | 64:21:15 | 64:21:15 |
| Li$_2$S used as the raw material | Pro. Ex. 1 | Pro. Ex. 1 | Pro. Ex. 2 | Pro. Ex. 2 | Pro. Ex. 2 | Pro Ex. 2 |
| Added amount of Isobutyronitile [g] | 0.2 | — | 6 | — | 6 | — |
| Content of isobutyronitrile [wt %] | 2.8 | — | 1.9 | — | 2.0 | — |
| Temperature of Crystallization [° C.] | 180 | 180 | 200 | 200 | 200 | 200 |
| XRD crystal pattern | Li$_7$P$_3$S$_{11}$ | — | Li$_3$PS$_4$ | — | — | — |
| Ionic conductivity [S/cm] | $1.7 \times 10^{-3}$ | $1.1 \times 10^{-4}$ | $1.2 \times 10^{-4}$ | $1.2 \times 10^{-4}$ | $1.5 \times 10^{-3}$ | $4.0 \times 10^{-4}$ |

The invention claimed is:

1. A method for producing sulfide-based glass ceramics comprising:
producing sulfide-based glass comprising at least a sulfur element and a lithium element in a mixed solvent of a nitrile compound and a hydrocarbon-based solvent to produce a glass solid electrolyte in which the nitrile compound is incorporated into the sulfide-based glass; and
crystallizing the glass solid electrolyte,
wherein the sulfide-based glass is produced by using lithium halide.

2. The method for producing sulfide-based glass ceramics according to claim 1, wherein the glass solid electrolyte is crystallized by heating.

3. The method for producing sulfide-based glass ceramics according to claim 1, wherein the nitrile compound is a compound represented by the formula (3):

$$R(CN)n \qquad (3)$$

wherein, R is an alkyl group including 1 or more and 10 or less carbon atoms, a cycloalkyl group including 3 or more and 10 or less ring carbon atoms or a group having an aromatic ring including 6 or more and 18 or less ring carbon atoms, and n is 1 or 2.

4. A method for producing a sulfide-based glass, wherein a raw material comprising at least lithium sulfide and phosphorus sulfide is reacted in a mixed solvent of a nitrile compound and a hydrocarbon-based solvent, wherein a ball mill or a beads mill is used for the reaction.

5. The method for producing a sulfide-based glass according to claim 4, wherein
the raw material comprises a compound comprising an alkali metal element and/or a halogen element.

6. The method for producing a sulfide-based glass according to claim 5, wherein the alkali metal element is lithium and the halogen element is one or more selected from fluorine (F), chlorine (Cl), bromine (Br) and iodine (I).

7. The method for producing a sulfide-based glass according to claim 4, wherein
the nitrile compound is a compound represented by the formula (3):

$$R(CN)n \qquad (3)$$

wherein, R is an alkyl group including 1 or more and 10 or less carbon atoms, a cycloalkyl group including 3 or more and 10 or less ring carbon atoms or a group having an aromatic ring including 6 or more and 18 or less ring carbon atoms, and n is 1 or 2.

8. The method for producing a sulfide-based glass according to claim 7, wherein the R in the formula (3) is an alkyl group having a branched structure and including 3 or more and 6 or less carbon atoms.

9. The method for producing a sulfide-based glass according to claim 4, wherein the raw material comprises a compound comprising an alkali metal element and/or a halogen element, and
the nitrile compound is a compound represented by the formula (3):

$$R(CN)n \qquad (3)$$

wherein, R is an alkyl group including 1 or more and 10 or less carbon atoms, a cycloalkyl group including 3 or more and 10 or less ring carbon atoms or a group having an aromatic ring including 6 or more and 18 or less ring carbon atoms, and n is 1 or 2.

* * * * *